DON H. FLICKINGER
INVENTOR.

BY William D. Miller
ATTORNEY.

DON H. FLICKINGER
INVENTOR.

BY William D. Miller
ATTORNEY.

United States Patent Office 3,145,770
Patented Aug. 25, 1964

3,145,770
METHOD AND APPARATUS FOR STIMULATING AND TESTING EARTH FORMATIONS
Don H. Flickinger, Tulsa, Okla., assignor to Pan American Petroleum Corporation, Tulsa, Okla., a corporation of Delaware
Filed Jan. 27, 1961, Ser. No. 85,303
11 Claims. (Cl. 166—3)

This invention relates to the testing of formations penetrated by a well. More particularly, it concerns a method and apparatus for testing a formation while the well is filled with a drilling fluid which may have reduced the permeability of the formation.

It is common practice in the drilling of wells to test formations penetrated for the presence of oil and gas. These tests, commonly referred to as drill stem tests, are made with the well full of drilling fluid by setting a packer on the test tool to isolate the formation to be tested then reducing the pressure in the test zone. If there are fluids in the formation, they flow toward the zone of reduced pressure where they are collected by the sample chamber in the test too. The quantity of fluids collected in a given time, as well as the fluid pressure in the test zone, provide useful information concerning the productivity of the formation.

Unfortunately, these tests sometimes fail to identify formations which are capable of producing oil and gas in paying quantities. In some cases the drilling fluid may have deposited a filter cake which impedes the flow of fluids into the well. Also, the filtrate from the drilling fluid sometimes produces a permeability block near the well which prevents the flow of fluids into the well at rates which are representative of the productivity of the formation. In other cases the permeability of the formation is too low to get economic productivity unless it is stimulated, as by acidizing or hydraulic fracturing.

Various means for overcoming these difficulties have been taught in the prior art. The filter cake effect has been overcome to some extent by flushing the face of the formation with mud acid before making the test. A further improvement has been the injection of a stimulating fluid into the formation to increase the permeability near the well. While these improvements have increased the accuracy of the tests, some instances have been observed where the sample recovered in the test was a viscous or gelled mixture of drilling fluid and stimulating fluid. This material obviously resisted displacement of the stimulating fluid into the formation as well as the backflow of fluid which penetrated the formation. This observation demonstrates the necessity of removing fluids from the test zone which are incompatible with the stimulating fluid.

It is therefore an object of my invention to provide a method and apparatus for testing a formation in a well filled with drilling fluid wherein the drilling fluid is flushed from the well in the zone to be tested before a stimulating fluid is injected into the formation. Another object of my invention is to perform the steps of this improved method without the use of wire line equipment to manipulate the subsurface apparatus and without pulling the drill pipe between the steps of the operation. These and other objects of the invention will become apparent as the description of the invention proceeds.

In brief, my invention comprises the steps of first flushing drilling fluid from the well in the zone to be tested then setting a packer to confine simulating fluid to that zone of the well. An additional quantity of stimulating fluid is subsequently injected at the confined zone under sufficient pressure to penetrate the formation. When there has been a lapse of time suitable for stimulation of the formation, the test tool is opened to the drill pipe to permit formation fluids to flow into the test apparatus. The test tool is subsequently closed, the packer released and the assembly, including the sample, is withdrawn to the surface. This operation is carried out with the portion of the well above the test assembly filled with drilling fluid. Additionally, manipulation of the apparatus is by way of the drill pipe and does not require wire line equipment.

Figure 1:
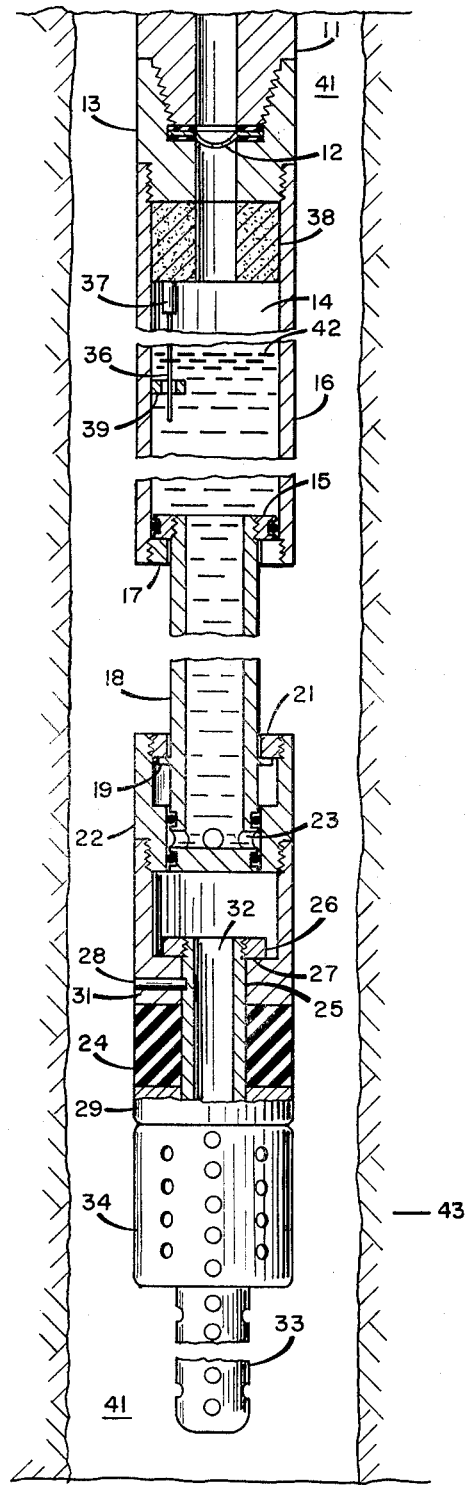
FIGURE 1 is an elevational view, partly in cross-section, showing the apparatus of my invention with its various parts in their positions as the test tool is being run in a well.

Referring to FIGURE 1 for a description of the apparatus, the tester is run on tubing or drill pipe 11. Frangible diaphragm 12 between the drill pipe and adapter 13 isolates the drill pipe from chamber 14 containing the stimulating fluid. Piston 15 in housing 16 hangs on head 17 in the lower end of housing 16 to support the lower section of the test tool. Piston rod 18 has ring 19 which engages upper stop 21 in this running positon. Sleeve valve body 22 closes fluid outlets 23 positioned radially at the lower end of the piston rod. The packer assembly includes packer element 24 on tubular mandrel 25. Flange 26 on the upper end of the tubular mandrel rests on shoulder 27 to provide tensile support for this packer assembly. Shear pin 28 holds the packer in a retracted position until sufficient pressure is applied to shear the pin. Lower shoe 29 supports the lower end of the packer element which is expanded by sliding upper shoe 31 down tubular mandrel 25. Passage 32 in the mandrel communicates with perforated anchor pipe 33. Section 34 is provided in the anchor pipe to accommodate a pressure recorder.

Figure 2:
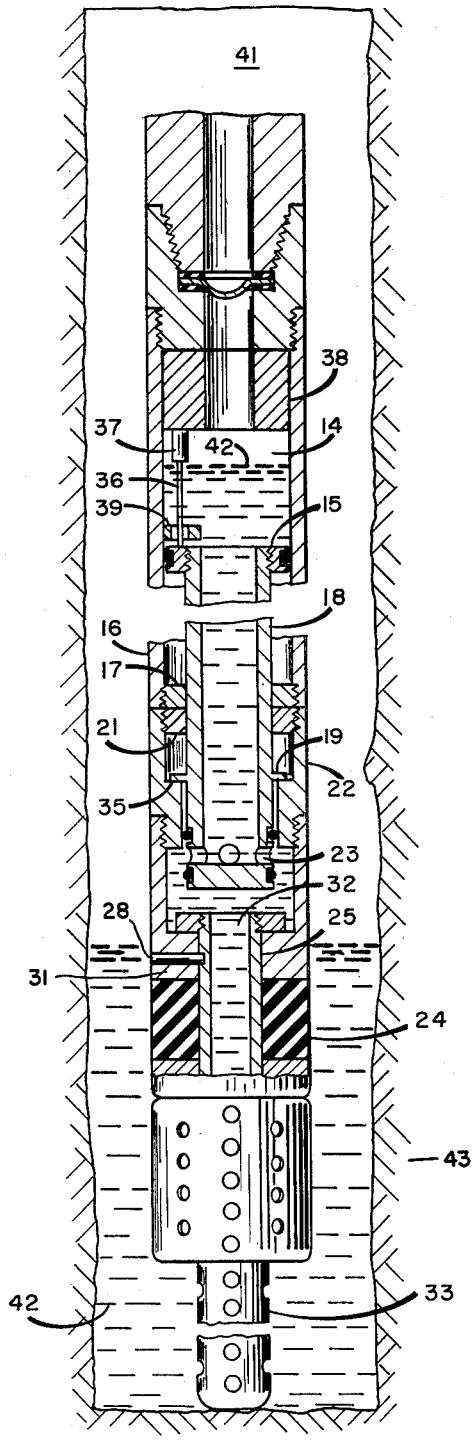
FIGURE 2 shows the apparatus as drilling fluid is being flushed from the zone in the well to be tested.

In FIGURE 2, anchor pipe 33 has landed on the bottom of the well enabling piston rod 18 to telescope into sleeve valve body 22 and chamber 14. The lower end of housing 16 and chamber head 17 engage the upper end of valve body 22 and upper stop 21. In this position, the upper face of piston 15 engages trigger 36 on delay mechanism 37, which ignites gas-producing charge 38 after a preset time delay.

Figure 3:
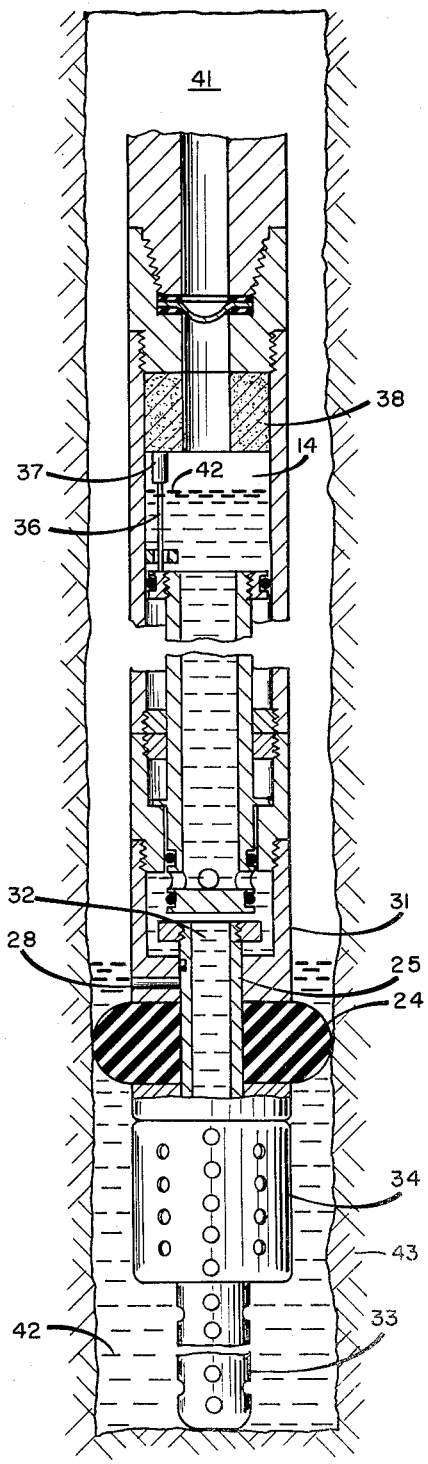
FIGURE 3 shows the position of the apparatus at the time stimulating fluid is injected into the formation.

Packer element 24 is expanded into the position shown in FIGURE 3 by increasing the weight on the tool until pin 28 shears, permitting upper shoe 31 to slide down mandrel 25. The tool maintains this position while gas-producing charge 38 displaces additional stimulating fluid 42 from chamber 14 and into formation 43.

A drill stem test is performed, according to my invention, by first placing a bottom hole pressure recorder in section 34 between the packer and anchor pipe. The tool may then be lowered into the well, with adapter 13 removed from the top of housing 16, until the open top is just above the top of the well. Propellant charge 38, including the delay mechanism for igniting the charge, is placed in the top of chamber 14. Trigger 36 on the delay mechanism may be stabilized by passing it through guide member 39. The adapter may then be inserted to hold the charge in place while the stimulating fluid is added to chamber 14. When the desired quantity of stimulating fluid has been added, frangible diaphragm 12 is inserted and secured by drill pipe 11. The tool is then run into the well until anchor pipe 33 touches the bottom of the well. Further lowering of the drill pipe relieves the tension on piston rod 18 and lowers the rod into sleeve valve body 22 until ring 19 lands on the upper shoulder of the valve body. With the piston rod in this position, fluid outlets 23 are uncovered whereby stimulating fluid 42 in chamber 14 can flow through piston rod 18, outlets 23, passage 32 in the tubular mandrel and discharge through perforated anchor pipe 33. The tool should be designed to deliver a volume of fluid which will displace drilling fluid 41 to a level above packer element 24. The volume of fluid which is displaced by piston 15 during this landing step can be varied by changing the lengths of housing 16 and hollow piston rod 18. The length of the piston rod should be such that it will engage trigger 36 when the lower end of housing 16 engages the upper end of valve body 22.

Piston 15 energizes time delay mechanism 37 when it contacts trigger 36. The delay mechanism may be any of several different types such as a spring-driven escapement device or a spring-loaded dashpot. A delay between about 1 and 5 seconds is usually adequate to set the packer and obtain a closed-in pressure reading before the charge is ignited. Gas-producing charge 38 is ignited at the end of the delay period. After the delay mechanism has been triggered and before the charge is ignited the drill pipe is lowered further to transfer the weight of the pipe to shear pin 28 which holds the packer retracted. When sufficient weight is placed on the pin it will shear and permit upper shoe 31 to slide down mandrel 25 and compress packer element 24. The packer expands radially until it engages the wall of the well, effectively sealing the annular space against vertical communication. Charge 38 is ignited shortly thereafter. The high gas pressure which develops as a result of the burning of the charge displaces stimulating fluid from chamber 14 through fluid outlets 23 in the lower end of the hollow piston rod. The fluid flows through passage 32 in the mandrel and is discharged from the perforated anchor pipe at the lower end of the tool. The high pressure imposed on the stimulating fluid in the confined space below the packer forces some of fluid 42 into formation 43. In certain instances the fluid injection rate may be sufficient to produce fractures in the formation. In other cases the fluid will penetrate and stimulate the formation without producing fractures.

When the stimulating fluid has been in contact with the formation for a sufficient length of time, the pressure in the well adjacent formation 43 is relieved to permit the stimulating fluid and formation fluids to enter the well and test tool. The pressure is reduced by rupturing frangible diaphragm 12. This may be done by dropping a steel spear down the drill pipe. Gas pressure inside the tool vents through the drill pipe and permits entry of fluids from the test zone. It is customary in drill stem tests to leave the tool open for a known length of time. Accordingly, this tool may be closed at any desired time simply by lifting on the drill pipe until fluid outlets 23 in the hollow piston rod are inside sleeve valve body 22. Placing the piston rod in tension removes the compressive force on the packer element, thus permitting the packer to collapse whereby the tool can be pulled from the well. The collected sample can be removed from the tool at the surface and analyzed to evaluate the formation tested.

The pressure recorder carried in section 34 is removed and the resulting pressure chart used in evaluating the formation. The events on the recorder chart can be correlated with the manipulative steps to identify important values such as the initial closed-in pressure, stimulating pressure, closed-in pressure after stimulation, and pressure decline during flow.

This tool may be used with any of numerous stimulating fluids. An acid, such as hydrochloric, or a mud acid containing hydrofluoric acid, can be used where it is desirable to dissolve a portion of the formation or filter cake. A typical low-filtrate-rate fracturing fluid might be preferred when the formation to be tested is a sandstone. A solution of a surface-active agent, such as that taught in U.S. Patent 2,779,418, Garst, might be useful where a water block is likely.

The quantity of stimulating fluid which the tool can accommodate may be varied simply by changing the length of housing 16. The length of trigger 36 should be changed by a corresponding amount in order that the delay mechanism will be actuated at the top of the piston travel. The size of the gas-producing charge is desirably chosen to yield a volume of gas at the pressure required to displace all of the stimulating fluid from the tool. The charge may be a propellant of the type frequently used as a source of high-pressure gas. These propellants are typically a mixture of nitrocellulose and nitroglycerin with minor amounts of other ingredients to regulate burning rate, etc., as well as provide the proper consistency for the mixture.

From the above, it can be seen that my invention provides a method and apparatus for obtaining reliable drill stem tests on a single trip of the test tool in and out of the well. It should be understood that although the invention has been described with particular reference to the apparatus shown in the drawings, other embodiments will be obvious to those skilled in the art.

I claim:

1. A method of stimulating and testing the productivity of a formation penetrated by a well containing a contaminating fluid, including the steps of lowering in the well on a tubular member a test tool containing a stimulating fluid, discharging a first portion of said stimulating fluid from said test tool whereby said contaminating fluid near said test tool is displaced, isolating from said contaminating fluid a zone in said well containing said stimulating fluid, displacing under pressure a second portion of stimulating fluid into said isolated zone and into said formation, thereafter establishing fluid communication between said tubular member and said test tool whereby fluids from said isolated zone and said formation can enter said test tool, and then withdrawing a sample of said fluids.

2. The method of claim 1 wherein said second portion of stimulating fluid is displaced into said formation by a gas-producing charge, said charge being ignited by a delayed action igniter activated during the discharge of said first portion of stimulating fluid from said test tool.

3. The method of claim 1 wherein said stimulating fluid is an acid having the ability to dissolve a portion of the minerals in said formation.

4. The method of claim 1 wherein said stimulating fluid is a low-penetrating fluid having a filtrate rate less than that of fluids in said formation and is displaced into said formation at a rate sufficient to initiate and extend fractures therein.

5. A method of stimulating and testing the productivity of a formation penetrated by a well containing a contaminating fluid, including the steps of lowering a test tool containing a stimulating fluid on a tubular member into said well until the lower end of said tool rests on the bottom of said well, placing a portion of the weight of said tubular member on said tool to open a valve in said tool and discharge a portion of said simulating fluid from said tool thereby displacing said contaminating fluid from said well opposite said formation, actuating a delayed action igniter in said tool, increasing the weight of said tubular member on said tool to set a packer between said tool and the wall of said well, thereby isolating the portion of said well below said packer from that portion of said well above said packer, maintaining said isolation with said increased weight on said tool while a further portion of stimulating fluid is discharged from said tool into said isolated portion of said well and said formation opposite thereof by a gas-producing charge ignited by said delayed action igniter, thereafter establishing fluid communication through said test tool between said formation and said tubular member whereby fluids from said formation can enter said test tool, then removing the weight of said tubular member from said tool to close said valve and trap within said test tool a sample of said formation fluids and unseat said packer, and then withdrawing said tool from said well and recovering said sample therefrom.

6. A formation stimulating and testing tool adapted for operation on a tubing extending from the surface to the formation to be tested, including upper and lower cylindrical tool bodies in axial alignment, means for connecting said upper tool body to the lower end of said tubing, a frangible seal between said upper tool body and said tubing, a tubular member between said upper and lower tool bodies adapted for telescopic movement into said upper and lower bodies, said tubular member being open at the upper end and closed at the lower end, a fluid reservoir in said upper body, a piston in said reservoir, said piston being connected to the upper end of said tubular member, a lower head in said reservoir adapted to support said piston when said tubular member is in tension, fluid outlets near the lower end of said tubular member, said tubular member providing a fluid passage therethrough from said reservoir to said outlets, a valve chamber in said lower tool body arranged for cooperation with said fluid outlets to control the flow of fluid therethrough, upper and lower shoulders in said lower body, a projection on said tubular member arranged for engagement with said upper and lower shoulders, a tubular mandrel depending from said lower body, a formation packer on said mandrel, a perforated anchor pipe on said mandrel below said packer, said anchor pipe and mandrel being in fluid communication with said valve chamber, and means to restrain the setting of said packer until a preset load is applied to said mandrel.

7. The formation stimulating and testing tool disclosed in claim 6, including a gas-producing charge in said reservoir and a time delay mechanism adapted to ignite said gas-producing charge actuable by said piston.

8. An apparatus for stimulating a formation penetrated by a well containing a contaminating fluid and thereafter testing the productivity of said stimulated formation, comprising a string of drill pipe extending from the surface to the formation to be tested, a housing having a stimulating fluid reservoir attached to the lower end of said drill pipe, a frangible seal between said reservoir and said drill pipe, a fluid outlet in said reservoir, a sleeve valve in said fluid outlet, said sleeve valve being closed when said apparatus is in tension and open when said apparatus is in compression, piston means in said housing to displace a first portion of stimulating fluid from said reservoir into said well, retrievable packer means to isolate a zone in said well opposite said formation, and gas-generating means in said housing arranged to inject a second portion of stimulating fluid into said isolated zone at a preset time following the displacement of said first portion of stimulating fluid.

9. An apparatus according to claim 8, including a pressure recorder attached to said packer and positionable within said isolated zone.

10. A tool for simulating and testing a formation in a well containing a contaminating fluid comprising a housing having a chamber for a stimulating fluid and a gas-producing charge, means to connect the upper end of said housing with a drill pipe, closure means between said housing and said drill pipe, a piston in said housing, a hollow piston rod attached to said piston, a valve means in operative engagement with said piston rod, a perforated anchor pipe in fluid communication with the outlet of said valve, said piston and rod being adapted for telescopic movement relative to said housing and valve means whereby said piston displaces stimulating fluid from said housing through said valve and anchor pipe when a first portion of the weight of said tool is placed on said anchor pipe, packer means on said tool between said housing and said anchor pipe, and packer setting means adapted for actuation when a second portion of the weight of said tool is placed on said anchor pipe.

11. The stimulating and testing tool disclosed in claim 10, including a pressure recorder below said packer means.

References Cited in the file of this patent

UNITED STATES PATENTS

| 2,170,354 | Stephens et al. | Aug. 22, 1934 |
| 2,913,053 | Westbrook | Nov. 17, 1959 |